United States Patent [19]

Saito et al.

[11] Patent Number: 5,006,705
[45] Date of Patent: Apr. 9, 1991

[54] LIGHT BEAM SCANNING APPARATUS WITH CONTROLLER FOR VARYING SPACING BETWEEN A PLURALITY OF SCANNING BEAMS

[75] Inventors: Susumu Saito, Hachioji; Akira Arimoto, Kodaira; Takeshi Mochizuki, Mito; Yasuyuki Tsuji, Katsuta; Minoru Ohshima, Katsuta; Minoru Seino, Katsuta, all of Japan

[73] Assignees: Hitachi, Ltd.; Hitachi Koki Co., Ltd., both of Tokyo, Japan

[21] Appl. No.: 390,400

[22] Filed: Aug. 7, 1989

[30] Foreign Application Priority Data

Aug. 12, 1988 [JP] Japan .................................. 63-199909

[51] Int. Cl.$^5$ .............................................. H01J 3/14
[52] U.S. Cl. ..................................... 250/235; 346/108
[58] Field of Search ............... 250/235, 236; 358/481, 358/494, 496; 350/6.8; 346/107 R, 108, 160

[56] References Cited

U.S. PATENT DOCUMENTS

| 4,644,160 | 2/1987 | Arimoto et al. | 250/201 |
| 4,725,855 | 2/1988 | Arimoto et al. | 346/108 |
| 4,760,407 | 7/1988 | Arimoto et al. | 346/108 |
| 4,841,137 | 6/1989 | Mochizuki | 346/108 |

FOREIGN PATENT DOCUMENTS 60-166916 8/1985 Japan .
2064846 6/1981 United Kingdom .

*Primary Examiner*—David C. Nelms
*Attorney, Agent, or Firm*—Fay, Sharpe, Beall, Fagan, Minnich & McKee

[57] ABSTRACT

A scanning apparatus for use in a laser beam printer or the like comprising a control means for varying the spacing between adjoining scanning beams of a plurality of laser beams, which further comprises a plurality of light sources, a means for changing intensity, including on/off states, of the beam from the light sources, and a rotating polygonal mirror for allowing the beams to scan the scanned plane in parallel, and is adapted, in accordance with the value of the pixel density of information to be recorded, such that, in the beam scanning direction, the area exposed to the beam is changed by changing the width of a beam intensity modulating pulse, and in the direction perpendicular to the beam scanning, the number of revolutions of the rotating polygonal mirror is changed.

45 Claims, 4 Drawing Sheets

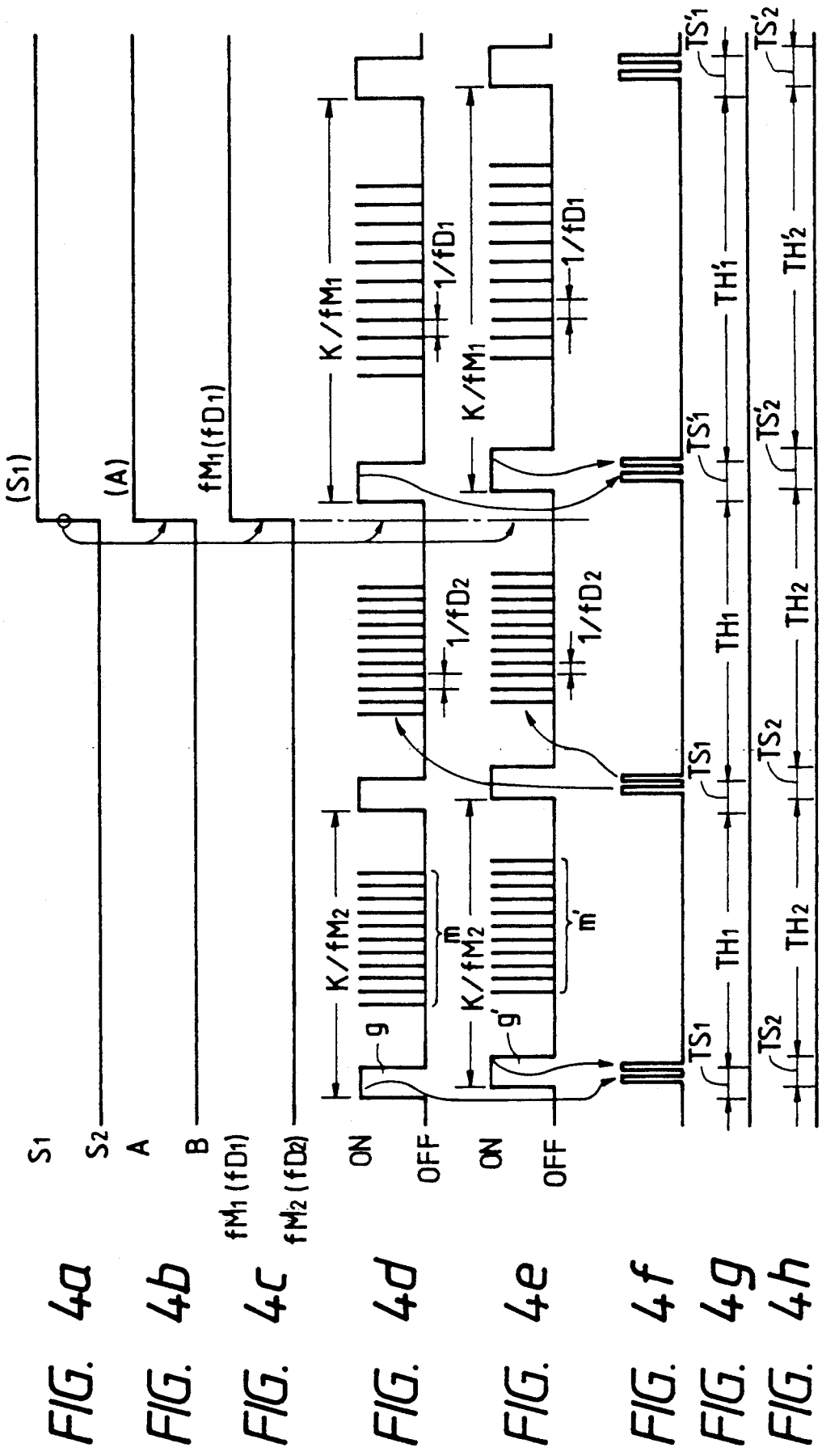

LIGHT BEAM SCANNING APPARATUS WITH CONTROLLER FOR VARYING SPACING BETWEEN A PLURALITY OF SCANNING BEAMS

BACKGROUND OF THE INVENTION

The present invention relates to a light beam scanning apparatus and more particularly to an apparatus using a plurality of light sources for scanning a plurality of light beams in parallel.

In a conventional light beam scanning apparatus such as a laser beam printer, light beam scanning is effected by moving a rotating polygonal mirror or a vibrating mirror at a high speed. With such arrangement, to attain higher speed operation and improved resolution, it becomes necessary to increase the operating speed of the rotating polygonal mirror or the vibrating mirror a great deal. However, there is a limit in its attainable speed. To cope with such a situation, a light beam scanning apparatus using a plurality of light sources so that a plurality of light beams are scanned in parallel on a scanned plane, while the beam spacing is kept constant, is proposed in Japanese Laid-open Pat. No. 60-166916, for example.

Such a hitherto proposed apparatus, however, has been designed to keep the spacing between the scanning beams at a predetermined constant value at all times, and there has not been given any consideration to have the beam spacing suitably changed so that its recording (pixel) density may be changed. Therefore, it has been difficult to change the recording density of the printer to a desired value.

SUMMARY OF THE INVENTION

An object of the present invention is to provide a high-performance light beam scanning apparatus adapted such that its recording density can be changed according to the change of the object to be recorded (such as, whether letters of simple form or patterns of complicated form), or more particularly, adapted such that its pixel density for information processed can be changed so that the information may be transferred or printed at high speed and with high precision.

To achieve the above described object, the light beam scanning apparatus of the present invention is provided with capability of simultaneous parallel scanning of a plurality of light beams and adapted, in particular, to be able to change the pixel density to prescribed values according to letters and patterns to be recorded or displayed.

Hence, the light beam scanning apparatus according to the present invention comprises (1) a plurality of light sources, (2) modulation means to turn on/off, and/or change intensity of, the beams from the light sources according to information to be recorded (all of which will hereinafter be referred to as "intensity modulation means", (3) scanning means for scanning the plural beams modulated for intensity in parallel on a scanned plane, (4) apparatus for variable beam spacing for controlling spacing between the scanning beams to thereby vary the display pixel density, and (5) control system for varying each of the modulating frequency provided by the intensity modulation means, and the scanning speed and the spacing between the scanning beams provided by the scanning means in accordance with the pixel density of the information to be recorded.

The present invention is further characterized by having detectors for detecting the position of each of the plural beams and beam path adjusters disposed in each of the optical paths of the beams and controlled by outputs from the detectors, of which photodetecting regions are changed as described later, so that the spacing between the scanning beams is varied.

BRIEF DESCRIPTION OF THE DRAWINGS

FIGS. 4a, 4b, 4c, 4d, 4e, 4f, 4g and 4h show time charts indicating operations in the present invention.

DESCRIPTION OF THE PREFERRED EMBODIMENT

In the light beam scanning apparatus of the present invention, it is adapted such that intensity of each beam emitted from each of a plurality of light sources is modulated in accordance with recorded information and the beams are scanned on a scanned plane in parallel with the spacing between the modulating beams kept constant. At this time, corresponding to prescribed pixel density, modulating frequency of light intensity is adjusted to provide suitable pixel density in the scanning direction and the value of scanning speed is adjusted to provide suitable pixel density in the direction perpendicular to the scanning direction. Further, by the provision of the detectors for detecting the spacing between the beams and the adjusters for adjusting the optical path of each beam, the beam spacing can be controlled so as to obtain suitable values on the scanned plane in accordance with prescribed pixel density (for example, such values that provide uniform pixel density both in the vertical direction and in the horizontal direction on the picture), and therefore multi-beam scanning adapted for changed pixel density can be achieved. Thereby, letters and patterns can be recorded in high quality at all times. Further, the aforesaid adjustments can be made quickly in a stabilized manner.

Figure 1:
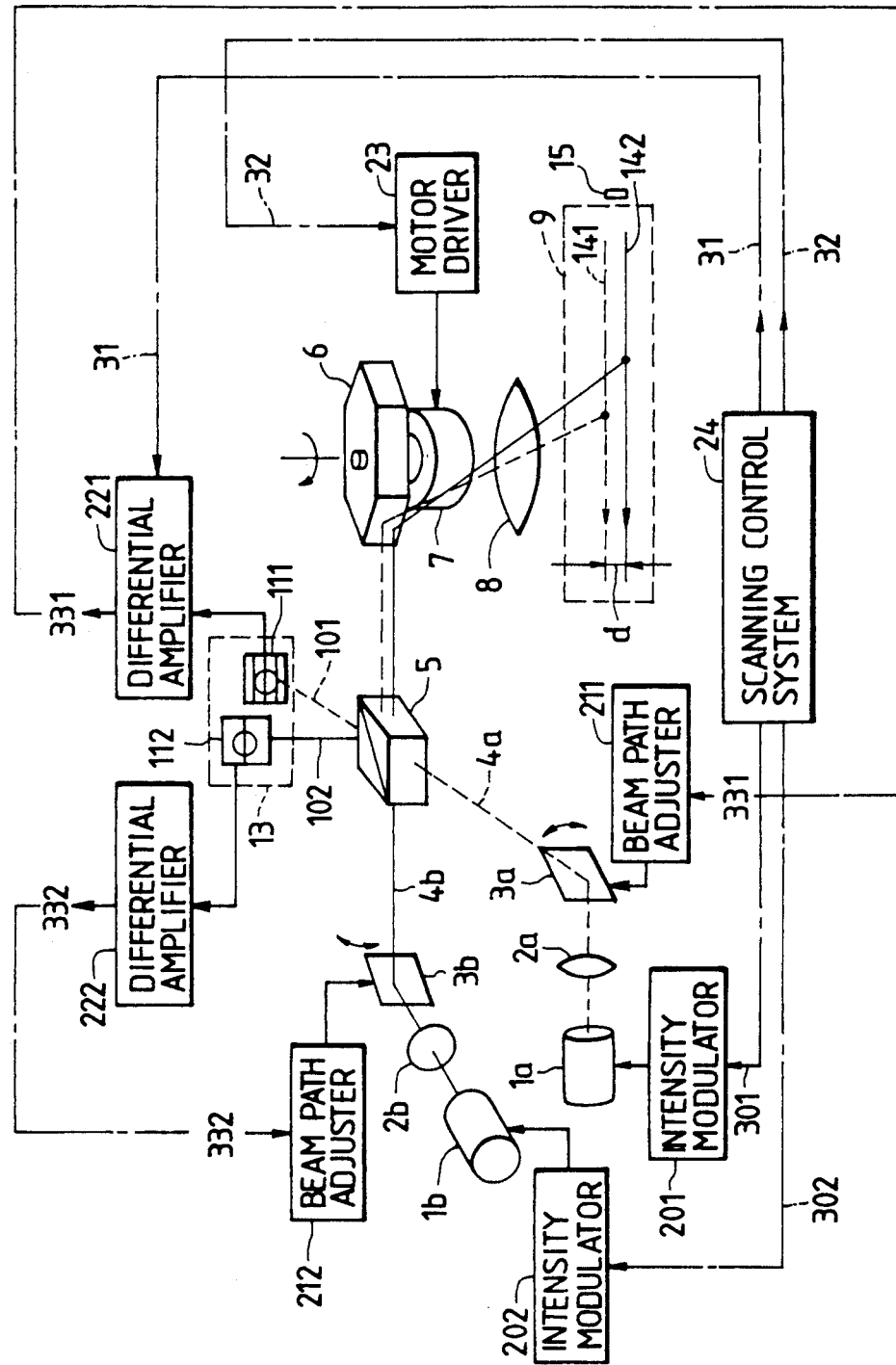
FIG. 1 is an overall structural diagram showing an embodiment of the present invention.

The present invention will be described below according to an embodiment. FIG. 1 shows an embodiment of the present invention. Two light sources 1a and 1b emitting linearly polarized light beams are used with the polarization direction of each light beam virtually put in orthogonal arrangement with respect to each other (P and S polarization). Beams 4a and 4b emitted from the light sources are led into a polarizing beam splitter 5 through lenses 2a, 2b and mirrors 3a, 3b provided with beam path adjusters 211, 212 (which adjust the optical paths, for example, through such mechanism as rotary drive members attached to the mirrors 3a, 3b driven by outputs 331, 332 of differential amplifiers 221, 222). The beam splitter 5 performs a function of allowing the P-polarized light to go straight on and to deflect the S-polarized light through a right angle, and hence, the beams 4a and 4b, after passing through the beam splitter 5, advance virtually in the same direction that is parallel to each other. Then, they are deflected by a rotating polygonal mirror 6 driven by motor 7, as their deflecting means and passed through a scanning lens 8 so as to make parallel beam scanning on a scanned plane 9 as scanning lines 141 and 142.

The scanning beam detector 15 is for indicating the scan starting position for each beam scanning. Signals $h_1$, $h_2$ are output from this detector 15, corresponding to the two beams, separated by distributor 41, and respectively passed to synchronizers 451, 452, and each is used as a sync signal at the time when data for recording (printing) are delivered.

Figure 2:
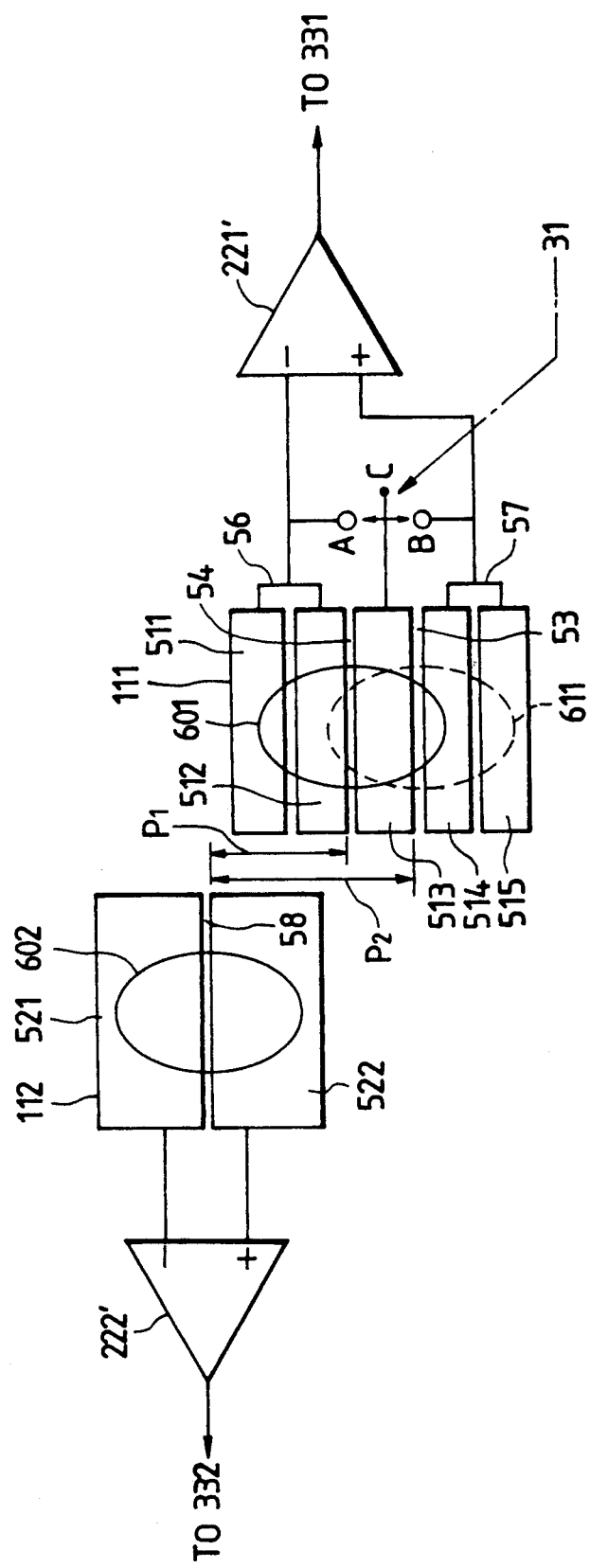
FIG. 2 is a detailed structural diagram showing a light detector system for use in the present invention for detecting and controlling the beam position and spacing.

Here, the spacing d between the scanning lines 141 and 142 must be maintained at a suitable value corresponding to a prescribed pixel density. To achieve this, portions of incident beams 4a and 4b on the beam splitter 5 are taken out of it as beams for control 101 and 102 and introduced into a detector 13, composed of beam position detectors 111 and 112. The detectors, as shown in FIG. 2, are each of the arrangement basically divided into two sections in the direction of lines 141, 142 perpendicular to the scanning direction, and adapted such that illumination power on both sides of the boundary of the divisional area between the sections are photoelectrically converted and taken out as electrical signals. Then, the signals are supplied to differential amplifiers 221 and 222 so that differential signals 331, 332 are produced to be supplied to beam path adjusters 211 and 212, whereby orientations of the mirrors 3a and 3b are adjusted so that the differential signals 331, 332 may be kept to zero at all times, and thus, the beams for control 101 and 102 can be steadily kept in positions in the center of the respective boundary of divisional area between the sections of the detectors 111 and 112.

Now, suppose, in the detector 111 shown in FIG. 2, that a terminal C of a lead wire is terminal B, and the output 331 resulting from the spot 601 is kept to zero, while, in the detector 112, that the output 332 resulting from the spot 602 is kept to zero. In that event, since the detectors 111 and 112 are put in such relative positions as to bring the spacing d between the scanning beams on the scanned plane 9 into being as shown in FIG. 1, the beams for control 101 and 102 are held stabilized and the spacing d between the scanning beams at this time can be kept constant as will be explained later in more detail.

Figure 3:
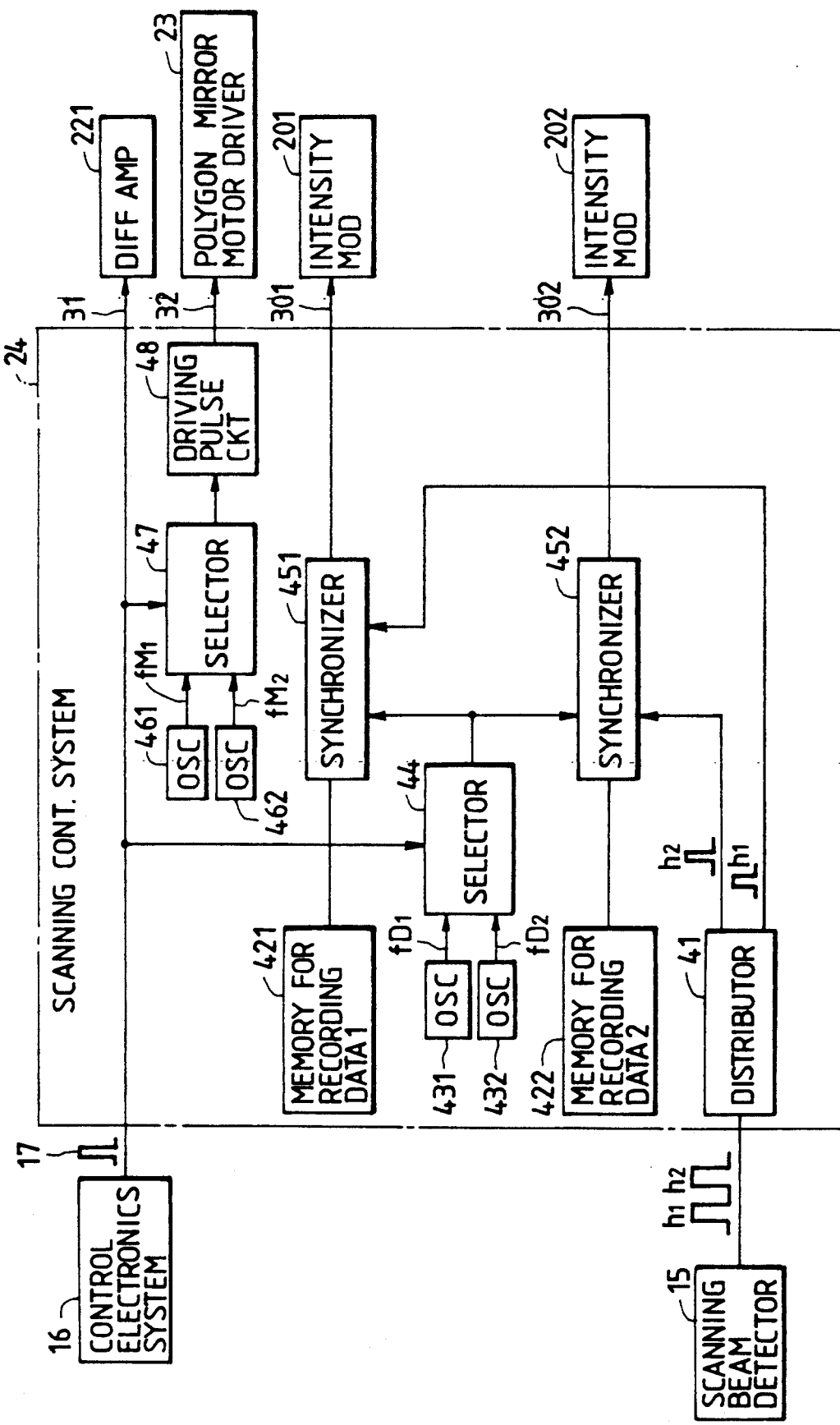
FIG. 3 is a circuit block diagram of the scanning control system for operating the apparatus of the present invention.

FIG. 3 is a diagram showing structure of scanning control system 24 (which is also shown in FIG. 1) for driving the above described optical system. Operation for changing pixel density is started by a dot density transfer command 17 from a control electronics system 16.

Now, when a moving speed of the scanned plane 9 perpendicular to lines 141, 142 is keep constant, operations for changing pixel density both in the beam scanning direction of lines 141 and in the direction perpendicular thereto will be consdered in the following.

First, in the scanning direction, the change in pixel density is achieved by adjusting the pulse width for beam intensity modulation on the pixel signal thereby changing the exposed area. Signals 301 and 302 therefor are delivered from the scanning control system 24 to the intensity modulators 201 and 202. At this time, either of oscillation frequencies f $D_1$ and f $D_2$ from oscillators 431 and 432 is selected by a selector 44 in response to the dot density transfer command 17. Then, data for printing (recording) 301, 302 from memories of recording data 421 and 422 are delivered, at the selected frequencies, by synchronizers to their respective intensity modulators 201 and 202, whereby the laser beams are turned on/off at prescribed rates to control pixel color intensity.

In order to change the pixel density in the direction perpendicular to the scanning direction, the number of revolutions of the rotating polygonal mirror 6 for deflecting the beams of light must be changed.

To achieve this, either of frequencies f $M_1$ and f $M_2$ from oscillators 461, 462 for driving the rotating polygonal mirror is selected by selector 47 within the scanning control system 24 in response to the dot density transfer command 17, and this selected frequency is passed through a driving pulse circuit 48. Therein, a clock pulse 32 for controlling the rotating speed is generated to operate a polygon mirror motor driver 23 so that a suitable rotating speed is obtained to attain a prescribed number of scans within a time period.

When a plurality of beams, two beams 141 and 142 in FIG. 1, for example, perform scanning at the same time, the spacing d between the plural scanning beams must be changed by the amount (which is preset) corresponding to the change in the pixel density. This is achieved by moving the boundary of divisional area (between either of 53 and 54, to be described later) of one detector 111 of those for detecting beam position in accordance with the spacing between the scanning beams.

The above mentioned operation is also performed through the scanning control system 24 in response to the dot density transfer command 17. A detector system to perform the operation is shown in FIG. 2. Illustrated is the case where the spacing d between beams is varied in two ways.

The detector 111 is for the beam 101 and detects the position of its spot 601. The detector 111 is constructed of five divisions of photodetecting elements 511 to 515. Of these elements, 511 and 512 as well as 514 and 515 are respectively electrically coupled through lead wires 56 and 57, to terminals A and B which in turn are coupled with a differential amplifier 221'. Meanwhile, the terminal C of a lead wire of the photodetecting element 513 is adapted to be selectively connected to either terminal A or B according to a signal 31 from the scanning control system 24. Preferably, signal 31 is the same as the dot density transfer command 17. When C is connected with A, the detector 111 functions as a divided-in-two detector with the boundary of divisional area 53 serving as the dividing line. By servo control corresponding to the differential signal 331 provided at this time, from differential amplifier 221' the beam spot comes to a stabilized state when it is positioned as shown by dotted line 611 on the detector 111 in FIG. 2. Meanwhile, as to the detector 112 being formed of divided-in-two photodetecting elements 521 and 522, the beam spot 602 is stabilized thereon corresponding to the differential signal 332 from differential amplifier 222', when it has the boundary of divisional area 58 serving as the dividing line in its center. At this time, the distance between the boundary of divisional area 53 and 58 of the two detectors is $P_2$, and corresponding to this value, the spacing d between the scanning beams 141 and 142 on the scanned plane is determined. Then, when C is connected with terminal B in response to the signal 31 from the scanning control system 24, the detector 111 functions as a divided-in-two detector having the boundary of divisional area 54 as the dividing line. The beam spot is now stabilized at the position 601 by the servo control dependent on the differential signal 331 at this time from differential amplifier 221'. Then, the distance between the two beam spots becomes $P_1$, and corresponding to which, the beam spacing d on the scanned plane can take another value.

Although the above embodiment as shown in FIG. 2 uses five independent photodetector elements for the divided photodetector elements, the present invention is also applicable to more than three independent photodetector elements for the divided photodetector elements.

As described above, when pixel density or printing dot density is changed in multi-beam scanning, the scanning beam spacing can always be maintained at a suitable value.

FIG. 4 shows time charts relating to operations of the scanning optical system of the present invention.

FIG. 4a shows states of two kinds of pixel densities (including dot density) $S_1$ and $S_2$ of which either one is selected. FIG. 4b shows the state of connection of the photodetecting element 513 of the detector 111 for controlling the beam position in FIG. 2, which occurs in succession to the state of the FIG. 4a (corresponding to the signal 31). FIG. 4c shows the state of the driving frequency $fM_1$ or $fM_2$ of the rotating polygonal mirror 6, which occurs following the state of FIG. 4a (corresponding to signal 32). Also, the laser modulating frequency $fD_1$ and $fD_2$ is similarly selected. FIGS. 4d and 4e show laser modulating signals (corresponding to signals 301 and 302). Of the same, the portion denoted by m, m' shows signal waveforms of the pattern to be recorded (printed) and the modulating frequency is $fD_1$ or $fD_2$. The scanning period K/fM is determined in a fixed proportion to the number of revolutions of the rotating polygonal mirror and K is the constant for that proportion. The portion denoted by g, g' is that where a laser is turned on (lighted) for detecting the beam position for each scanning. FIG. 4f shows the signal output waveform from the scanning beam detector 15 as a sync signal for determining the delivery timing of the dot signal representing the recording (printing) pattern. FIGS. 4g and 4h show sampling and holding times (corresponding to signals 331 and 332) of the sampled-data control system used for stabilizing the scanning beam spacing, in which $TS_1$ and $TS_2$ indicate sampling periods and $TH_1$ and $TH_2$ indicate holding periods. While the laser is turned on in the vicinity of the scanning starting position (TS, corresponding to g, g' in FIG. 4d, 4e), detection and control of the scanning beam spacing is performed, and this state is maintained during the period following it (TH), and these operations are repeated for each scanning.

As a concrete example of the beam path adjuster 211, 212, one employing electromagnetic drive represented by a galvano mirror or a piezoelectric element for minute adjustment of the mirror or the like being widely known may be used.

Further, when it becomes necessary to change the beam spot diameter depending on the value of the pixel density, such means as a beam power adjuster may be used combined with the present invention.

Although the case where two beams are used for scanning was described above, the present invention is applicable to beam scanning using more than two beams.

The present invention, as described so far, is provided with means to change the scanning beam spacing to prescribed values and to maintain the value in a stabilized manner in performing multi-beam scanning with the use of a plurality of light sources, and therefore, it can change pixel density or printing dot density using the same arrangement to thereby produce a high quality image at all times for image formation. Besides, these operations can be achieved without requiring troublesome adjustments such as mechanical adjustment but can be achieved through electrical adjustment. Since the adjustments can be performed relatively easily requiring no sophisticated adjustments, a great effect is obtained that a high-performance and easily operable light beam scanning apparatus can be provided.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. A light beam scanning apparatus for recording information to be recorded, comprising:
   a plurality of light sources generating a plurality of beams;
   intensity modulators changing intensity of the beams from said light sources in accordance with the information to be recorded;
   a scanner scanning said beams in parallel on a scanned plane;
   adjusters adjusting the relative positions of said beams on said scanned plane; and
   a controller controlling at least one of said adjusters so that the relative positions of said beams on said scanned plane vary between at least two different relative positions in accordance with corresponding different pixel densities of the information.

2. A light beam scanning apparatus according to claim 1, wherein there are provided position detectors which detect deviation between positions of said beams on said scanned plane by part of said beams, at least one of said position detectors having photodetecting regions changed by said controller in accordance with the pixel density of the information, and said adjusters are controlled by the outputs of said position detectors to maintain beam positions at the beam positions changed by said controller.

3. A light beam scanning apparatus according to claim 2, wherein said at least one position detector is formed of more than three independent photodetector elements.

4. A light beam scanning apparatus according to claim 3, wherein said at least one position detector is constructed of five juxtaposed photodetector elements, for which there are provided two terminals A and B which respectively electrically connects two photodetector elements on both sides of the five photodetector elements, and also, there is provided one terminal C electrically led from the photodetector element disposed in the middle of the five photodetector elements, whereby the positions of said beams on said scanned plane are changed in accordance with the condition of the terminal C, being in contact with the terminal A, or being in contact with the terminal B.

5. A light beam scanning apparatus according to claim 1, wherein said light sources are a plurality of separated lasers.

6. A light beam scanning apparatus according to claim 2, further including a prism synthesizing said beams from said light sources so that said beams travel in substantially the same direction with slightly deviated positions from each other.

7. A light beam scanning apparatus according to claim 6, wherein said prism splits out respective portions of said beams and passes said portions toward said detectors.

8. A light beam scanning apparatus according to claim 1, wherein said scanner includes a rotatably mounted polygonal mirror and a scanning lens, each in the path of said beams.

9. A light beam scanning apparatus according to claim 7, wherein said scanning lens is an Fθ lens.

10. A laser printer for printing information at a desired pixel density selected from among a plurality of densities, comprising:
- a plurality of lasers generated a plurality of laser beams respectively;
- a prism synthesizing said laser beams in the same direction and with slightly deviated positions from each other;
- a deflector deflecting said laser beams for scanning;
- a photoconductive element mounted to be scanned parallely on the surface thereof by said laser beams;
- a detector detecting deviation from a set position of said plural laser beams on said surface by detecting at least part of said laser beams;
- adjusters adjusting the position of said laser beams with respect to each other on said surface in accordance with said detected deviation; and
- a controller controlling at least one of said adjusters so that different positions of said laser beams on said surface are selectively set in accordance with the desired printing pixel density of the information to provide the set position for said detector.

11. A laser printer as set forth in claim 10, wherein said detector has photodetecting regions selectively changed by said controller in accordance with the pixel density of the information.

12. A laser printer as set forth in claim 11, wherein there are provided intensity modulators changing intensity of said laser beams from said lasers in accordance with the information, and said controller provides said intensity modulators and said deflector respectively with a modulating frequency and a scanning speed that are selectively set to different values in accordance with the desired printing pixel density of the information.

13. A laser printer as set forth in claim 12, including a photodetector detecting each printing line start timing for scanning lines on said surface of said photoconductive material and providing a synchronizing output signal, and means providing an operational timing of said intensity modulators with the aid of said synchronizing output signal of said photodetector.

14. A laser printer as set forth in claim 11, wherein said prism provides a portion of each of said beams and passes said portions toward said detector.

15. A laser printer as set forth in claim 11, including a scanning lens between said deflector and said photoconductive element.

16. A laser printer as set forth in claim 15, wherein said scanning lens is an Fθ lens.

17. A laser printer as set forth in claim 11, wherein said deflector is a rotatably mounted polygonal mirror.

18. A laser printer for printing information at a desired pixel density selected from among a plurality of densities, comprising:
- a source generating a plurality of laser beams;
- a deflector deflecting said laser beams for scanning;
- a photoconductive device mounted to be scanned parallely on the surface thereof by said laser beams;
- position detectors having photodetecting regions and detecting deviation from a set position of said plural beams on said surface by at least part of said laser beams;
- adjusters adjusting the positions of said laser beams on said surface in accordance with the deviation detected by said position detector; and
- a controller controlling at least one of said position detectors to selectively provide the set position by selectively changing the photodetecting regions of said position detectors so that the positions of said laser beams on said surface are correspondingly changed in accordance with the desired pixel density of the information.

19. A laser printer as set forth in claim 18, including a photodetector detecting each printing line start timing for scanning lines on said surface of said photoconductive device.

20. A laser printer as set forth in claim 19, wherein said photodetector receives said laser beams after said laser beams are deflected by said deflector.

21. A laser printer as set forth in claim 18, wherein said sources are a plurality of separate lasers.

22. A laser printer as set forth in claim 18, wherein said controller is electrically connected to said sources for controlling said sources so that said laser beams are always turned on for a fixed portion of each line scan, and said position detectors detect the deviation during said portion of the line scan.

23. A laser printer as set forth in claim 21, including a prism in the path of said beams between said lasers and said deflector for synthesizing said laser beams to extend in substantially the same direction at spacings from each other such that said laser beams slightly deviate from each other.

24. A laser printer as set forth in claim 23, including means for splitting a portion of said beams and passing said portion to said position detectors.

25. A laser printer as set forth in claim 18, including a scanning lens in the path of said laser means between said deflector and said photoconductive device.

26. A laser printer as set forth in claim 18, wherein said deflector is a rotatably mounted polygonal mirror.

27. A laser printer for printing information at a desired pixel density selected from among a plurality of densities, comprising:
- a source for generating a plurality of laser beams;
- a deflector deflecting said laser beams for scanning;
- a photoconductive device mounted to be scanned parallely on the surface thereof by said laser beam;
- a position detector having a plurality of light detecting segments mounted with respect to each other so as to receive respective portions of said laser beams and detecting deviation of said laser beams from a set position between the segments;
- means for maintaining said laser beams at the set position in accordance with the detected deviation by a feedback control so that the relative positions of said laser beams with respect to each other are held at the set position; and
- a controller electrically connected to said position detector, and said source, and said controller selectively changing the segments of said position detector to selectively change the set position at a value corresponding to the desired pixel density from among a plurality of values corresponding to different pixel densities so that said means for maintaining will maintain the laser beam relative positions at the set position corresponding to the selected desired pixel densities.

28. A laser printer as set forth in claim 27, wherein said means for maintaining includes an adjuster for adjusting the paths of at least one of said laser beams in accordance with the detected deviation.

29. A laser printer as set forth in claim 27, wherein said source is a plurality of lasers.

30. A laser printer as set forth in claim 27, including a photodetector mounted to receive at least a portion of said laser beams after said laser beams are deflected by said deflector.

31. A laser printer as set forth in claim 29, wherein said controller controls said lasers so that said laser beams are always in the on condition within a fixed blanking time.

32. A laser printer as set forth in claim 29, including a prism in the path of said laser beams between said lasers and said deflectors, so that said prism synthesizes said plural laser beams in the same direction and slightly deviated positions from each other.

33. A laser printer as set forth in claim 32, wherein said prism splits out a portion of said beams and directs said portion toward said position detector.

34. A laser printer as set forth in claim 27, including a scanning lens between said deflector and said photoconductive device along the path of said laser beams.

35. A laser printer as set forth in claim 27, wherein said deflector is a rotatably mounted polygonal mirror.

36. A laser printer for printing information at a desired pixel density selected from among a plurality of densities, comprising:

means, including a prism, synthesizing two laser beams to travel along a path in the same direction and with slightly deviating positions from each other;

a deflector deflecting said laser beams for scanning;

a photoconductive device mounted to be scanned parallely on the surface thereof by said laser beams;

a position detector having a plurality of photoconductive segments combined and mounted to receive at least a portion of said two laser beams and detecting a deviation of the position of said laser beams from a set position on the surface on the basis of a relationship between the segments;

adjusters adjusting the path of said laser beams in accordance with the detected deviation; and a controller electrically connected to said position detector, said means for synthesizing lasers and said deflector, said controller changing the relationship of the segments of said position detector to selectively change the set position from among a plurality of different set positions and selectively providing a modulating frequency from among a plurality of different modulating frequencies to said means for synthesizing laser beams and selecting a scanning speed of said deflector from among a plurality of different scanning speeds, with each of said selecting being in accordance with the desired pixel density from among a plurality of different pixel densities.

37. A laser printer as set forth in claim 36, wherein said prism splits said laser beams to pass a portion of said laser beams toward said photoconductive device and said position detector.

38. A laser printer as set forth in claim 36, including a scanning lens positioned along the path of said laser beams between said deflector and said photoconductive device.

39. A laser printer as set forth in claim 36, wherein said deflector is a rotatably mounted polygonal mirror.

40. A laser printer as set forth in claim 36, including a photodetector provided in the vicinity of said photoconductive device to receive a portion of said laser beams deflected by said deflector and for detecting a starting position of each scan on said surface for providing a synchronizing signal to said means for generating laser beams.

41. A laser printer as set forth in claim 40, wherein said controller controls said adjusters so that the positions of said laser beams on said surface are controlled for a printing time portion of each scan and in accordance with the information and controls said means for generating laser beams so that said laser beams are on in a blanking time for each scan; and said position detector detecting the deviation within said blanking time.

42. A recorder for recording information at a desired pixel density selected from among a plurality of densities, comprising:

means synthesizing at least two laser beams to travel along a path in the same direction and with slightly deviating positions from each other;

means scanning said laser beams;

a position detector mounted to receive at least a portion of said laser beams and detecting a deviation of the position of at least said portion from a set position;

adjusters adjusting the path relative position of said laser beams in accordance with the detected deviation; and a controller to selectively change the set position from among a plurality of different set positions selectively providing a modulating frequency from among a plurality of different modulating frequencies to said means for synthesizing laser beams and selecting a scanning speed of said deflector from among a plurality of different scanning speeds, with each of said selecting being in accordance with the desired pixel density from among a plurality of different pixel densities.

43. The recorder of claim 42, said controller providing a modulating frequency from among a plurality of different modulating frequencies to said means synthesizing laser beams in accordance with the desired pixel density.

44. The recorder of claim 42, said controller selecting a scanning speed from among a plurality of different scanning speeds, in accordance with the desired pixel density.

45. The recorder of claim 44, said controller providing a modulating frequency from among a plurality of different modulating frequencies to said means synthesizing laser beams in accordance with the desired pixel density.

* * * * *